United States Patent [19]
Smith

[11] 3,792,621
[45] Feb. 19, 1974

[54] DRIVE BELT
[76] Inventor: Thomas R. Smith, 710 W. 11th St., Newton, Iowa 50208
[22] Filed: Oct. 11, 1972
[21] Appl. No.: 296,516

[52] U.S. Cl. .............. 74/231 R, 74/231 P, 156/137
[51] Int. Cl. ............................................... F16g 5/00
[58] Field of Search 74/231 R, 231 P, 238; 156/137

[56] References Cited
UNITED STATES PATENTS
| | | | |
|---|---|---|---|
| 2,173,340 | 9/1939 | Myers | 74/231 R |
| 2,109,717 | 4/1938 | Arnold | 74/238 |
| 1,822,135 | 9/1931 | Fisher | 74/238 |

FOREIGN PATENTS OR APPLICATIONS
| | | | |
|---|---|---|---|
| 607,968 | 9/1960 | Italy | 74/238 |
| 594,105 | 10/1959 | Italy | 156/137 |
| 456,647 | 9/1950 | Italy | 156/137 |
| 1,094,571 | 12/1955 | France | 74/231 |

Primary Examiner—Charles J. Myhre
Assistant Examiner—R. H. Lazarus
Attorney, Agent, or Firm—Richard L. Ward

[57] ABSTRACT

A drive belt is formed of a generally continuous filament of polyurethane material extending repeatedly around the length of the belt to form a multiplicity of strands. The circumferential strands are integrally interconnected along the contiguously adjacent surfaces of the individual strands to form a generally unitary belt construction.

5 Claims, 6 Drawing Figures

PATENTED FEB 19 1974 3,792,621

DRIVE BELT

BACKGROUND OF THE INVENTION

1. Field of the Invention

This invention relates to drive belts and more particularly to drive belts comprising a multiplicity of integrally interconnected strands.

2. Description of the Prior Art

Drive belts shown in prior art have commonly been formed by a molding and vulcanization process with reinforcing material molded in place and with a covering applied to the surface. Other belts have been formed of an elongated length of material and joined at the ends by adhesive, rivets or the like to form an endless loop. More recently, extruded lengths of urethane have been joined at the ends by heat or solvent welding to form an endless belt having stretch characteristics. Certain disadvantages are associated with these prior art belts. For example: Belts including fabric rear the surface tend to wear and fray after a sometimes small amount of use; belts joined at the ends have accompanying problems associated with the joint. There is, therefore, a continuing search for an improved drive belt.

SUMMARY OF THE INVENTION

It is an object of the instant invention to provide an improved drive belt, and fabrication method therefor, having a multiplicity of strands integrally interconnected along at least portions of the contiguously adjacent longitudinal surfaces.

It is a further object of the instant invention to provide an improved drive belt formed by winding on a suitable form a long length of elastomeric filament to form the drive belt and integrally interconnecting the contiguously adjacent strands.

The instant invention achieves these objects in a drive belt having a multiplicity of integrally interconnected strands extending around the belt and formed by winding a long length of elastomeric filament on a pulley-like form having a desired belt shape and then heating the filament material to integrally connect the contiguous longitudinal surfaces of adjacent strands.

Specific construction of the improved drive belt and further objects and advantages thereof will become evident as the description proceeds and from an examination of the accompanying sheet of drawings.

BRIEF DESCRIPTION OF THE DRAWINGS

The drawings illustrate a preferred embodiment of the invention with similar numerals referring to similar parts throughout the several views wherein.

DESCRIPTION OF A PREFERRED EMBODIMENT

Figure 1:
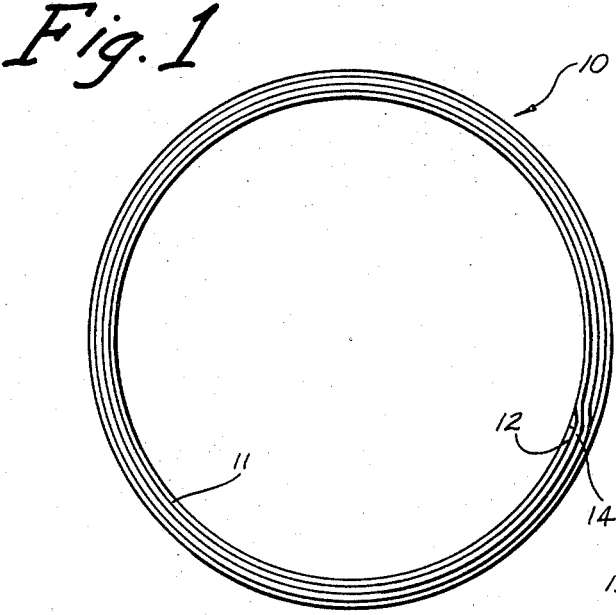
FIG. 1 is a view of a drive belt embodying the instant invention.

Referring to FIG. 1, there is shown a V-belt 10 embodying the instant invention. The view shows strands 11 extending longitudinally, and generally endlessly, along the belt 10. The stranded belt is formed by a method including the winding of an extended length of elastomeric filament on a pulley-like form having a cross sectional groove and circumference approximating that of the desired belt.

For convenience, the original extended length of elastomeric material will be termed a filament while each complete turn comprising a portion of the belt will be termed a strand, such as 11.

Referring again to FIG. 1, it is seen that the initial end 12 of the filament may be visible at the surface of the belt 10, as may the final end, but both will tend to blend and compress so as to be effectively flush to the surface of the belt 10. A small offset of adjacent strands, such as at 14, may occur as they pass over the initial end 12 of the filament, but the effective cross section of the belt 10 will remain generally constant.

Figure 2:
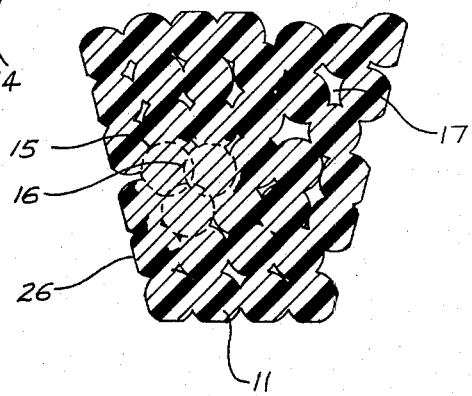
FIG. 2 is an enlarged section view of a drive belt of FIG. 1.

The cross section of the V-belt of FIG. 2 is typical of the belt of the instant invention. Structurally the belt includes a multiplicity of elastomeric strands 11, each somewhat distinct, yet integrally joined through the longitudinally contiguous surfaces of adjacent individual strands such as 15 and 16 shown in broken lines representing the original filament shape. The connection is achieved by a welding of the contiguous surfaces under the presence of heat or heat and pressure. The pressure may be only from elasticity of the original filament and varying with the winding tension or may include additional externally applied pressure as will be shown.

The enlarged view of FIG. 2 shows that the strands 11, 15 and 16, for example, tend to flatten or join and form an integral connection between contiguous surfaces of adjacent strands where generally line-to-line contact was originally present. It is noted, however, that the degree of interconnection of the strands and also, the size and spacing of the open interstices 17 between strands, depend on the material characteristics, the relative size of the filament, the winding tension, and the curing temperature and external pressure, for example.

In a particular reduction to practice of the instant invention, a V-belt 10 was fabricated having a section width at the top of approximately ¼ inch, a section height of approximately ¼ inch, and a peripheral length of approximately 16 inches. The filament was polyurethane of approximately 1/16 inch diameter.

Figure 3:
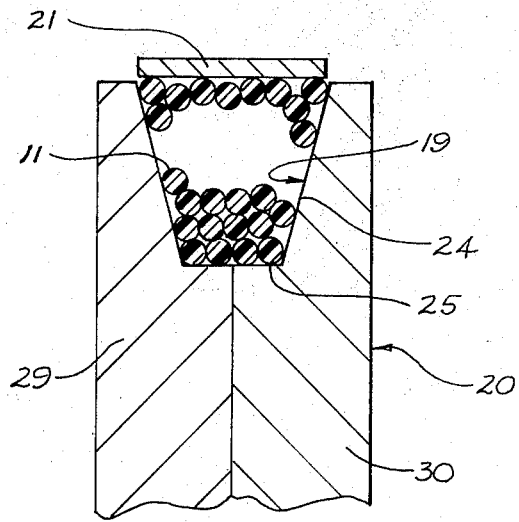
FIG. 3 is a fragmentary section view of a form and belt at an intermediate step in the fabrication of a belt as shown in FIG. 1 by the method of the instant invention.

A belt embodying the instant invention may be formed by a process including the following steps:

a. extruding an extended length of polyurethane filament;

b. winding the filament in a V-belt shaped groove 19 of a circular form 20 to substantially fill the groove 19, as in FIG. 3;

c. assemblying a resilient tension band 21 on the outside of the strands 11, as also shown in FIG. 3;

d. heating the form 20 and material thereon to approximately 400° F which is an approximate welding temperature for polyurethane;

e. cooling the form 20 and material; and f. removing the belt from the form 20.

The belt 10 as formed thus includes a multiplicity of strands 11 integrally interconnected along at least portions of contiguously adjacent surfaces. The strands 11 at the sides 24 and bottom 25 of the groove while providing a ribbed surface, may be flattened slightly, as shown at 26 in FIG. 2, as a result of the external pressure forcing the heat-softened material into the groove 19.

The form 20 on which the filament is wound may be split or formed as two halves 29 and 30 for easy removal of the belt, but a split form may not be necessary for very long belts or small section belts. The form 20 need not be circular, but could be oval, for example. The tension band 21 can be omitted from the process under certain conditions.

Heating of the belt material can be quickly achieved in a microwave oven in which case the form should be a dielectric material such as ceramic or glass.

Figure 4:
FIGS. 4 through 6 are section views of alternate embodiments of the instant invention.
Figure 5:
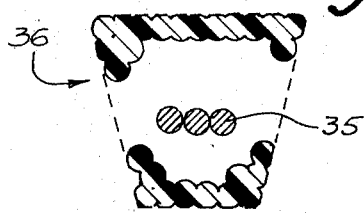
Figure 6:
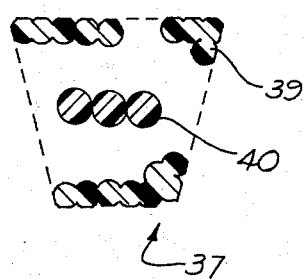

FIGS. 4, 5 and 6 show alternate embodiments of the instant invention. The belt may, for example, be formed in shapes other than a V-belt, such as the flat belt 34 of FIG. 4, and subjected to greater pressures to obtain a generally uniform belt as shown.

In the use of a elastomeric material such as polyurethane, as described, the belt will have stretch characteristics. If a non-stretch belt is desired, however, reinforcing material such as metal wire 35 may be wound into a reinforced belt 36 as in FIG. 5. The wire should be an endless loop or should extend around the belt 36 for more than one strand. In addition, the wire filament may need to be treated to give good adhesion to the thermoplastic elastomer of which the belt is formed.

FIG. 6 shows an alternate embodiment in which filaments of two different sizes 39 and 40 are formed into a belt 37 to obtain particular characteristics.

Thus it is clear that the instant invention provides a belt different from previous belts. Either course or fine filaments can be used; a combination of materials can be used; and various shaped belts can be formed. The fabrication process is simple and inexpensive.

In the foregoing drawings and specification, there has been set forth a preferred embodiment of the invention and although specific terms are employed, these are used in a generic and descriptive sense only and not for purposes of limitation. Changes in form and the proportion of parts as well as the substitution of equivalents are contemplated as circumstances may suggest or render expedient without departing from the spirit or scope of this invention.

I claim:

1. A drive belt comprising: at least one generally circular elastomeric filament extending repeatedly along the length of the belt to form a multiplicity of strands in generally contiguous relationship of one strand with the adjacent, said adjacent strands being integrally interconnected one with the other along a welded junction at the mating longitudinal surfaces to form a unitary structure of interconnected generally distinct strands and longitudinally extending random interstices therebetween.

2. A drive belt as defined in claim 1 wherein said stranded belt is formed of polyurethane material.

3. An endless drive belt comprising a multiplicity of generally circular strands of elastomeric material integrally interconnected by welded junctions around the circular cross section to adjacent strands and extending along at least a portion of the contiguously adjacent longitudinal surfaces of the strands to form a unitary structure of homogeneous material and including longitudinally extending random interstices therebetween.

4. A method for forming a drive belt comprising the steps of: winding at least one filament of generally circular elastomeric material on a form having a selected pulley-like groove, continuing said winding of filament to a depth exceeding the final desired belt configuration, installing a retaining band on the outer periphery of the elastomeric material for applying compression to the windings of filament, heating the stranded elastomeric material on said form to approximately the weld temperature of the elastomeric material, said compression and heating being sufficient to shape said strands and to effect an integral welded connection of contiguous surfaces of adjacent strands for forming a unitary structure of homogeneous material and including longitudinally extending random interstices therebetween, removing the compression band from the periphery, and removing the stranded belt from the form.

5. A method of forming a drive belt as in claim 4 and further including the step comprising the winding of a dissimilar filament onto said form with said elastomeric material.

* * * * *